(12) United States Patent
Chandran et al.

(10) Patent No.: US 8,200,972 B2
(45) Date of Patent: Jun. 12, 2012

(54) ENCRYPTION OF SECURITY-SENSITIVE DATA BY RE-USING A CONNECTION

(75) Inventors: Gayathiri R. Chandran, San Jose, CA (US); James W. Pickel, Gilroy, CA (US); Michael R. Springgay, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/912,652

(22) Filed: Oct. 26, 2010

(65) Prior Publication Data

US 2011/0055563 A1 Mar. 3, 2011

Related U.S. Application Data

(63) Continuation-in-part of application No. 11/082,474, filed on Mar. 16, 2005, now abandoned.

(51) Int. Cl.
*H04L 9/32* (2006.01)
(52) U.S. Cl. .............. 713/168; 713/189; 726/2; 380/26; 709/227; 709/228; 709/229
(58) Field of Classification Search .......... 713/168, 713/189; 726/2; 380/26; 709/227, 228, 709/229
See application file for complete search history.

(56) References Cited

U.S. PATENT DOCUMENTS

| | | | |
|---|---|---|---|
| 5,825,890 A * | 10/1998 | Elgamal et al. ............... | 713/151 |
| 6,052,466 A | 4/2000 | Wright | |
| 6,212,635 B1 | 4/2001 | Reardon | |
| 6,240,514 B1 | 5/2001 | Inoue et al. | |
| 6,381,699 B2 | 4/2002 | Kocher et al. | |
| 7,043,632 B2 * | 5/2006 | Chapman et al. ............. | 713/153 |
| 7,312,707 B1 | 12/2007 | Bishop et al. | |
| 7,506,368 B1 * | 3/2009 | Kersey et al. .................. | 726/12 |
| 2001/0039579 A1 | 11/2001 | Trcka et al. | |
| 2002/0042875 A1 | 4/2002 | Shukla | |

(Continued)

OTHER PUBLICATIONS

Office Action 1, Nov. 17, 2008, for U.S. Appl. No. 11/082,474, Total 11 pp.

(Continued)

*Primary Examiner* — April Shan
*Assistant Examiner* — Joseph Pan
(74) *Attorney, Agent, or Firm* — Janaki K. Davda; Konrad Raynes & Victor LLP

(57) ABSTRACT

Techniques are provided for processing data. Connections having different security properties are stored, wherein each of the connections allows applications at the client computer to access data sources at a server computer. A request is received from an application to access a data source, wherein the request has associated security properties. In response to the client computer requesting establishment of a connection on behalf of the application, it is determined whether there is a stored connection that used a same set of security properties as are associated with the request from the application and that connected to the data source that the application requests access to. In response to determining that there is a stored connection that used the same set of security properties and that connected to the data source, the connection and an associated client encryption seed, client encryption token, server encryption seed, and server encryption token are re-used. In response to determining that there is not a connection that used the same set of security properties and that connected to the data source, a new client connection key, client encryption seed, client encryption token, sever connection key, server encryption seed, and server encryption token are generated.

15 Claims, 13 Drawing Sheets

U.S. PATENT DOCUMENTS

| | | | |
|---|---|---|---|
| 2002/0065919 | A1 | 5/2002 | Taylor et al. |
| 2002/0069361 | A1 | 6/2002 | Watanabe et al. |
| 2002/0129261 | A1 | 9/2002 | Cromer et al. |
| 2002/0178370 | A1* | 11/2002 | Gurevich et al. ............. 713/189 |
| 2003/0005317 | A1 | 1/2003 | Audebert et al. |
| 2003/0023845 | A1 | 1/2003 | VanHeyningen |
| 2003/0028646 | A1* | 2/2003 | Wray ............................ 709/227 |
| 2003/0044019 | A1 | 3/2003 | Vanstone et al. |
| 2003/0055877 | A1 | 3/2003 | Williams et al. |
| 2003/0115450 | A1 | 6/2003 | Smith |
| 2003/0182429 | A1* | 9/2003 | Jagels ........................... 709/227 |
| 2003/0204738 | A1 | 10/2003 | Morgan |
| 2003/0217288 | A1 | 11/2003 | Guo et al. |
| 2004/0005061 | A1 | 1/2004 | Buer et al. |
| 2004/0022391 | A1 | 2/2004 | O'Brien |
| 2004/0025014 | A1 | 2/2004 | Kaler et al. |
| 2004/0054914 | A1 | 3/2004 | Sullivan |
| 2004/0078595 | A1* | 4/2004 | Kent et al. .................... 713/201 |
| 2005/0108517 | A1* | 5/2005 | Dillon et al. ................. 713/150 |
| 2005/0114367 | A1 | 5/2005 | Serebrennikov |
| 2005/0208947 | A1* | 9/2005 | Bahl ............................. 455/450 |
| 2006/0210071 | A1 | 9/2006 | Chandran et al. |
| 2007/0280482 | A1* | 12/2007 | Yan et al. ..................... 380/278 |

OTHER PUBLICATIONS

Final Office Action 1, May 13, 2009, for U.S. Appl. No. 11/082,474, Total 9 pp.

Office Action 3, Oct. 16, 2009, for U.S. Appl. No. 11/082,474, Total 11 pp.

Office Action 4, Apr. 27, 2010, for U.S. Appl. No. 11/082,474, Total 11 pp.

Amendment 1, Feb. 17, 2009, for U.S. Appl. No. 11/082,474, Total 11 pp.

Amendment 2, Aug. 13, 2009, for U.S. Appl. No. 11/082,474, Total 13 pp.

Amendment 3, Jan. 13, 2010, for U.S. Appl. No. 11/082,474, Total 13 pp.

Abbot, H.P., IBM Corp., "Key Replacement by Transparent Transmission", IBM Research Disclosure 446179, Jun. 2001, Total 2 pp.

* cited by examiner

US 8,200,972 B2

ENCRYPTION OF SECURITY-SENSITIVE DATA BY RE-USING A CONNECTION

CROSS-REFERENCE TO RELATED APPLICATIONS

This application is a continuation-in-part of and claims the benefit of "ENCRYPTION OF SECURITY-SENSITIVE DATA", having application Ser. No. 11/082,474, filed Mar. 16, 2005, the entire contents of which is incorporated herein by reference.

BACKGROUND

1. Field

Embodiments of the invention relate to encryption of security-sensitive data.

2. Description of the Related Art

When a client computer needs data from a server computer, a connection is established between the client computer and the server computer. Encrypted data may be sent over the connection.

When a data stream contains a portion of security-sensitive data, the data stream may be encrypted before being transmitted from a first computer system to a second computer system. With currently available solutions, such as Secure Socket Layer (SSL), the entire data stream that is being transmitted is encrypted at the first computer system. Then, the second computer system decrypts the entire data stream. Thus, in conventional solutions, the entire data stream is encrypted, although only a portion of the data stream may contain security-sensitive information. In many situations, the entire data stream is much larger than the portion of the data stream that is security-sensitive. Therefore, performance is affected when the entire data stream is encrypted and decrypted. In light of this, there is a need in the art for improved encryption of a data stream.

BRIEF SUMMARY

Provided are a method, computer program product, and system for processing data. Connections having different security properties are stored, wherein each of the connections allows applications at the client computer to access data sources at a server computer. A request is received from an application to access a data source, wherein the request has associated security properties. In response to the client computer requesting establishment of a connection on behalf of the application, it is determined whether there is a stored connection that used a same set of security properties as are associated with the request from the application and that connected to the data source that the application requests access to. In response to determining that there is a stored connection that used the same set of security properties and that connected to the data source, the connection and an associated client encryption seed, client encryption token, server encryption seed, and server encryption token are re-used. In response to determining that there is not a connection that used the same set of security properties and that connected to the data source, a new client connection key, client encryption seed, client encryption token, sever connection key, server encryption seed, and server encryption token are generated.

BRIEF DESCRIPTION OF THE SEVERAL VIEWS OF THE DRAWINGS

Referring now to the drawings in which like reference numbers represent corresponding parts throughout:

FIG. 5 includes FIG. 5A, FIG. 5B, and FIG. 5C.

DETAILED DESCRIPTION

In the following description, reference is made to the accompanying drawings which form a part hereof and which illustrate several embodiments. It is understood that other embodiments may be utilized and structural and operational changes may be made without departing from the scope of the invention.

Figure 1:
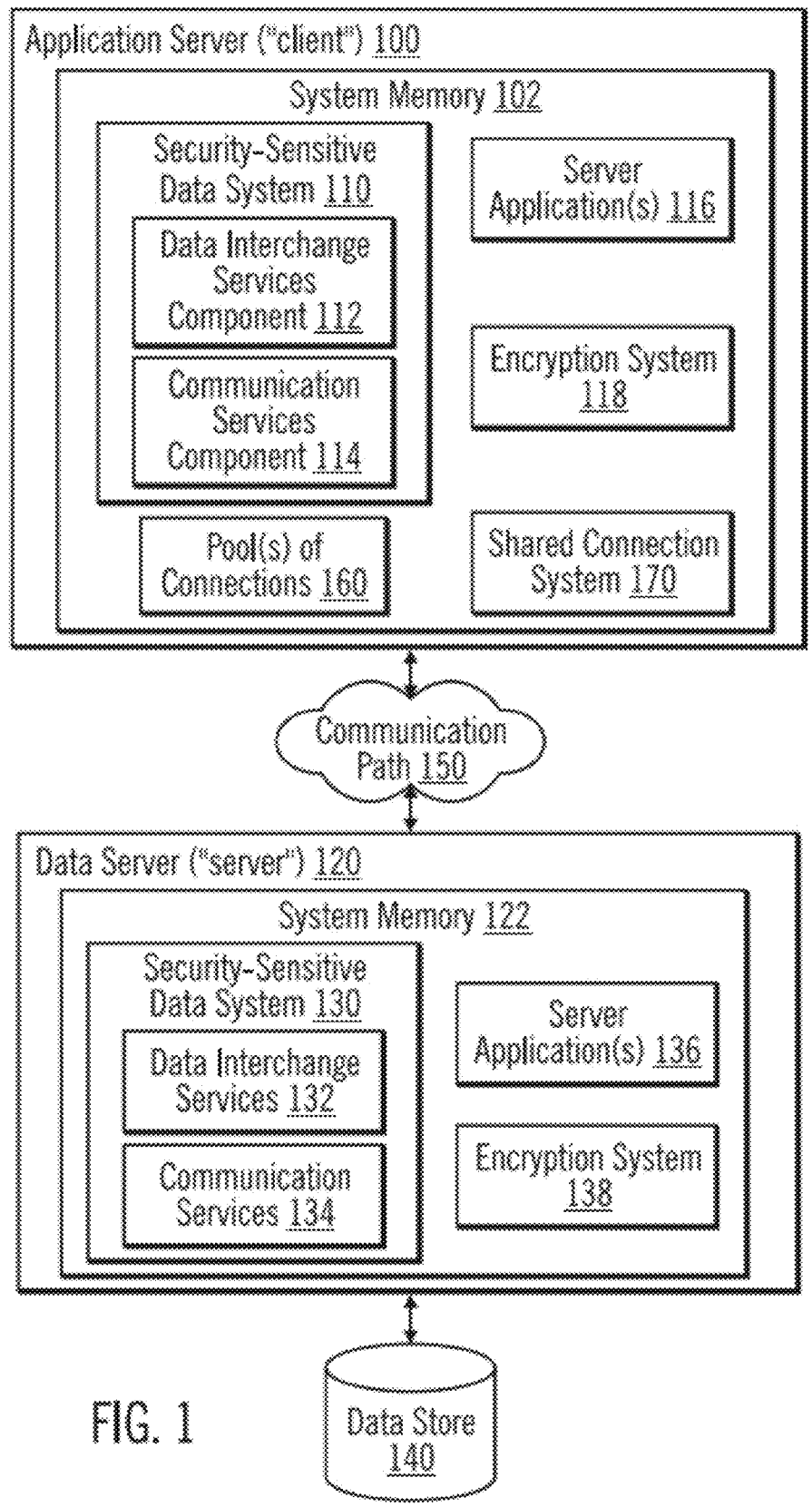
FIG. 1 illustrates, in a block diagram, a computing environment in accordance with certain embodiments of the invention.

FIG. 1 illustrates, in a block diagram, a computing environment in accordance with certain embodiments of the invention. An application server 100 is connected via a communication path 150 to a data server 120. The application server 100 may also be referred to as a "client" because the application server 100 submits requests to the data server 120. The data server 120 may also be referred to as a "server" because the data server 120 responds to the requests with replies. The application server 100 includes system memory 102, which may be implemented in volatile and/or non-volatile devices. A security-sensitive data system 110, one or more server applications 116, an encryption system 118, one or more pools of connections 160, and a shared connection system 170 are stored in the system memory 102 for execution on application server 100. A connection 160 between the application server 100 (i.e., client) and the data server 120 enables data to be transmitted between the application server 100 and the data server 120. A pool of connections 160 may be described as a grouping of connections.

In certain embodiments, there are multiple types of pools of connections 160. For example, there can be a single pool with connections having different security properties, and these connections may be shared by different applications (e.g., different server applications 116). As another example, there can be multiple pools that each contain connections with the same security properties (i.e., a common set of security properties), and these connections may be shared by different applications (e.g., different server applications 116).

The security properties may identify one or more security-sensitive portions of data to be encrypted (e.g., user identification may be encrypted), may indicate that all data is to be encrypted, may indicated that none of the data is to be encrypted, and/or may specify a specific encryption technique (e.g., Advanced Encryption Standard (AES) or Data Encryption Standard (DES)).

The shared connection system 170 determines that a connection in the pool qualifies for re-use if the connection has already been established to the same data source using the same security properties. In certain embodiments, the stored connection is associated with the client encryption seed, the client encryption token, the server encryption seed, and the server encryption token. Therefore, the client encryption seed, the client encryption token, the server encryption seed, and the server encryption token are re-used, and there is no client and server connection key generation.

In alternative embodiments, the stored connection has an associated client connection key, (from which a client encryption seed and a client encryption token may be derived) and a server connection key (from which a server encryption seed and a server encryption token may be derived). Therefore, the same client and server connection keys are re-used, and there is no client and server connection key generation.

If a connection in the pool cannot be re-used, then there is an exchange of client and server connection keys and new client and server security tokens and seeds are generated. Thus, with embodiments, connection keys are re-used, which improves performance.

In various embodiments, a connection in a pool may be terminated based on various factors (e.g., based on not being used for a period of time, pool size limits or a reuse count).

The security-sensitive data system 110 is capable of encrypting or decrypting security-sensitive data (e.g., security-sensitive user data) in a data stream. The security-sensitive data system 110 includes a data interchange services component 112 and a communication services component 114. The data interchange services component 112 identifies a security-sensitive portion of data. The communication services component 114 determines that a portion is identified as security-sensitive and calls the encryption system 118 to encrypt or decrypt the portion of security-sensitive data. When encryption is performed, the communication services component 114 marks the portion as being security sensitive and transmits the data stream. The marking enables the receiver of the data stream to identify the portion that has been encrypted.

The data server 120 includes system memory 122, which may be implemented in volatile and/or non-volatile devices. A security-sensitive data system 130, one or more server applications 136, and an encryption system 138 are stored in the system memory 122 for execution on data server 120. The security-sensitive data system 130 is capable of encrypting or decrypting security-sensitive data (e.g., security-sensitive user data) in a data stream. The security-sensitive data system 130 includes a data interchange services component 132 and a communication services component 134. The data interchange services component 132 identifies a security-sensitive portion of data. The communication services component 134 determines that a portion is identified as security-sensitive and calls the encryption system 138 to encrypt or decrypt the portion of security-sensitive data. When encryption is performed, the communication services component 134 marks the portion as being security sensitive and transmits the data stream. The marking enables the receiver of the data stream to identify the portion that has been encrypted.

The data server 120 provides the application server 100 with access to data in a data store 140.

The application server 100 and data server 120 may comprise any computing device known in the art, such as a server, mainframe, workstatation, personal computer, hand held computer, laptop telephony device, network appliance, etc. The communication path 150 may comprise any type of network, such as, for example, a Storage Area Network (SAN), a Local Area Network (LAN), Wide Area Network (WAN), the Internet, an Intranet, etc. The data store 140 may comprise an array of storage devices, such as Direct Access Storage Devices (DASDs), Just a Bunch of Disks (JBOD), Redundant Array of Independent Disks (RAID), virtualization device, etc.

Figure 2A:
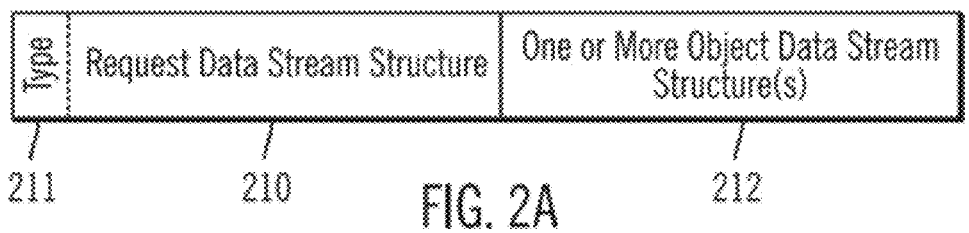
FIGS. 2A, 2B, and 2C illustrate data streams in accordance with certain embodiments.
Figure 2B:
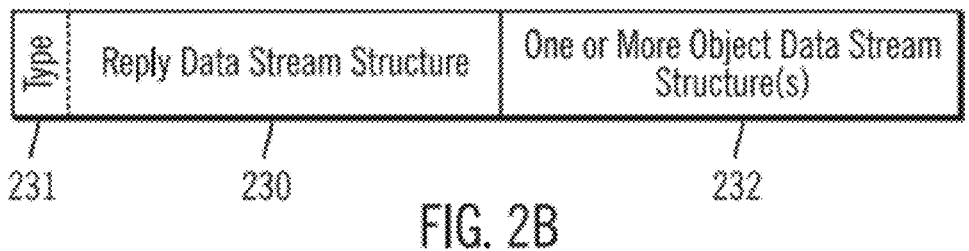

FIGS. 2A and 2B illustrate data streams 200, 220 in accordance with certain embodiments. Database data streams provide a well defined infrastructure in which data streams may include request data stream structures, reply data stream structures, object data stream structures, and encrypted object data stream structures. Each data stream structure includes a data stream structure header that identifies a data stream structure type as: request, reply, object or encrypted object.

In FIG. 2A, a request data stream 200 is one sent by a client to a server. The request data stream 200 includes a request data stream structure 210 and one or more object data stream structures 212. The request data stream structure has a data stream structure type 211 that indicates that it is a "request". A subset or all of the one or more object data stream structures 212 may be encrypted. Each unencrypted object has a data stream structure type that indicates that it is an "object". Also, each encrypted object has a data stream structure type that indicates that it is an "encrypted object".

In FIG. 2B, a reply data stream 220 is one sent by a server to a client. The reply data stream 220 includes a reply data stream structure 230 and one or more object data stream structures 232. The reply data stream structure has a data stream structure type 231 that indicates that it is a "reply". A subset or all of the one or more object data stream structures 232 may be encrypted.

The request data stream structure 210 and reply data stream structure 230 contain database command data that is not security-sensitive. One or more of the object data stream structures 212, 232 may contain security-sensitive data.

Figure 2C:
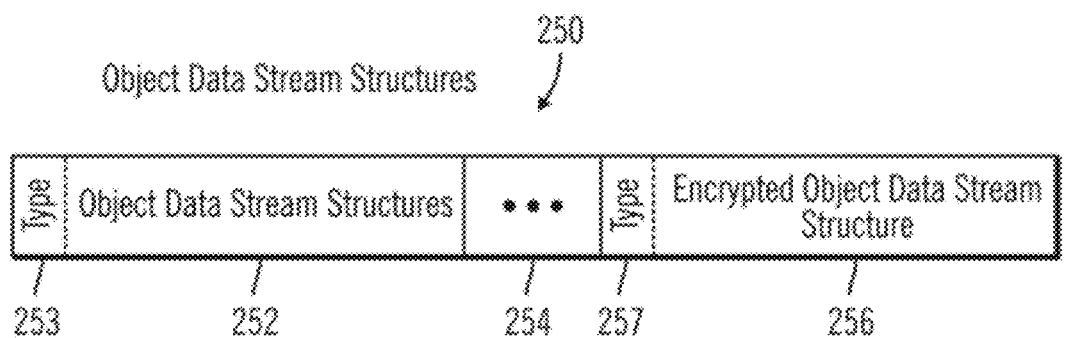

FIG. 2C illustrates a sample set of object data stream structures 250. Object data stream structure 252 does not contain security-sensitive data and is not encrypted. Object data stream structure 256 contains security-sensitive data and is encrypted. The ellipses 254 indicate that there may be additional encrypted or unencrypted objects in the set 250. The object data stream structure has a data stream structure type 253 that indicates that it is an "object". Also, the encrypted object has a data stream structure type 257 that indicates that it is an "encrypted object". Thus, the one or more object data stream structures 212, 232 that contain security-sensitive data are marked as containing such data (e.g., marked by setting a data stream structure type in a data stream structure header to encrypted object). Thus, the security-sensitive data system 110, 130 is able to determine that an object data stream structure that is so marked contains security-sensitive data.

Figure 3:
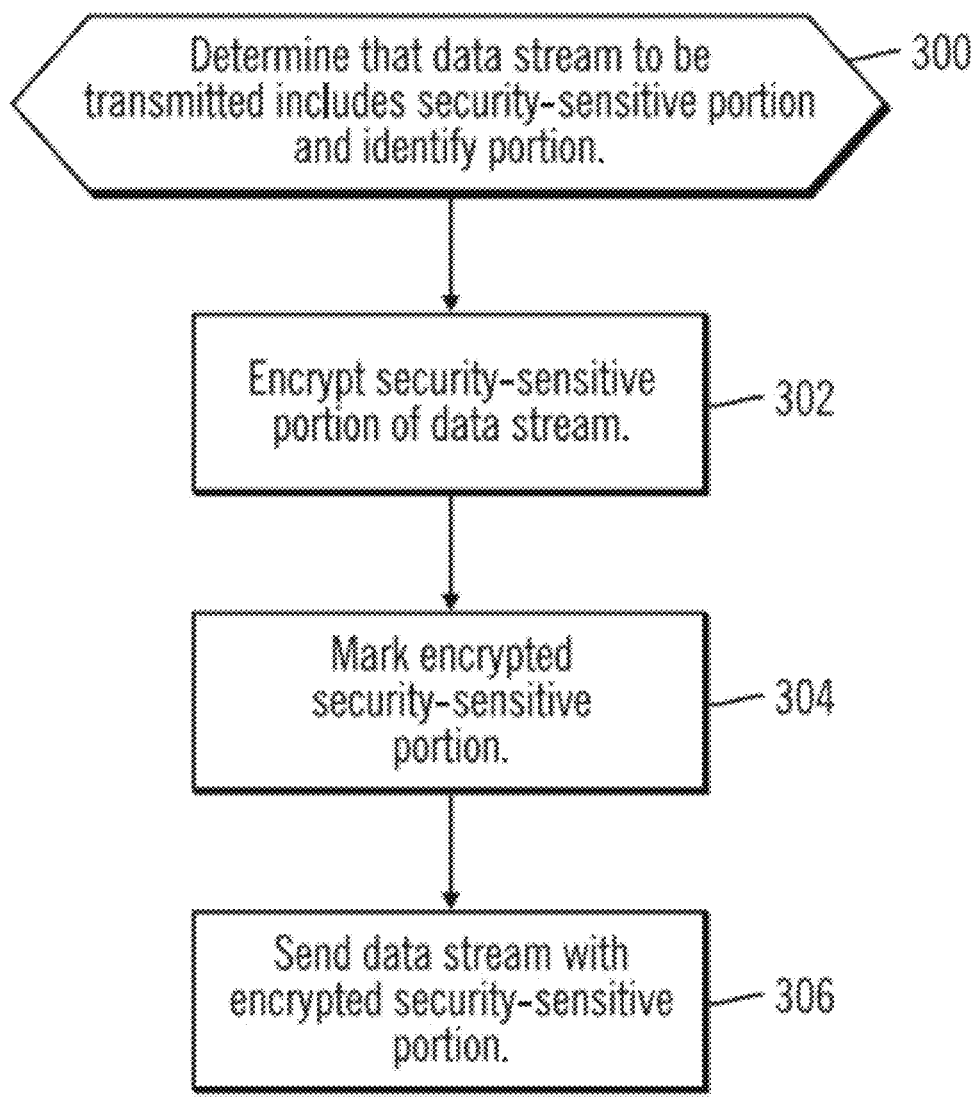
FIG. 3 illustrates logic performed by the security-sensitive data system when transmitting a data stream in accordance with certain embodiments.

FIG. 3 illustrates logic performed by the security-sensitive data system 110, 130 when transmitting a data stream in accordance with certain embodiments. Control begins at block 300 with the data interchange services component 112, 132 of the security-sensitive data system 110, 130 determining that a data stream to be transmitted includes a security-sensitive portion (i.e., some part of the data stream includes security-sensitive data) and identifying the portion. In block 302, the communication services component 114, 134 of the security-sensitive data system 110, 130 invokes the encryption system 118, 138 to encrypt the identified security-sensitive portion of the data stream. In block 304, the communication services component 114, 134 of the security-sensitive data system 110, 130 marks the encrypted portion. In block 306, the communication services component 114, 134 of the security-sensitive data system 110, 130 transmits the data stream with the encrypted security-sensitive portion. Thus, the entire data stream is not encrypted.

In certain embodiments, a database data stream is transmitted. The database data stream defines well formatted data structures that identify security-sensitive data, as are described in FIGS. 2A, 2B, and 2C. When transmitting a database data stream the portion encrypted may be marked by setting the data stream structure type to "encrypted object". In other embodiments, the portion to be encrypted may be identified in another manner. For example, in another alternative, a client may send encrypted data in a first request object and non-encrypted data in a second request object, and the portion to be encrypted may be identified by the type of request object.

Figure 4:
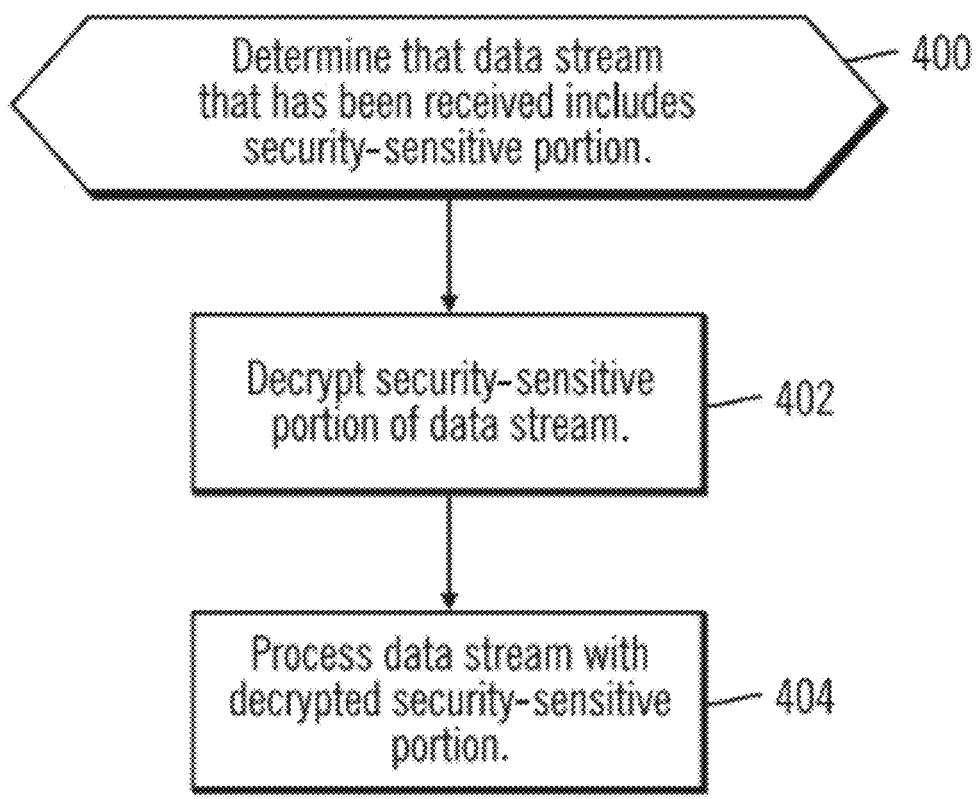
FIG. 4 illustrates logic performed by the security-sensitive data system when receiving a data stream in accordance with certain embodiments.

FIG. 4 illustrates logic performed by the security-sensitive data system 110, 130 when receiving a data stream in accordance with certain embodiments. Control begins at block 400 with communication services component 114, 134 of the security-sensitive data system 110, 130 determining that a data stream that has been received includes a security-sensitive portion (i.e., some part of the data stream includes security-sensitive data). In block 402, the communication services component 114, 134 of the security-sensitive data system 110, 130 invokes the encryption system 118, 138 to decrypt the security-sensitive portion of the data stream. In block 404, the security-sensitive data system 110, 130 processes the data stream with the decrypted security-sensitive portion. Thus, the entire data stream is not decrypted.

When receiving a database data stream, the portion to be decrypted may be identified based on a structure having a data stream structure type of "encrypted object". In other embodiments, the portion to be decrypted may be determined in another manner (e.g., based on the type of request object where certain types include encrypted data).

By encrypting only the security-sensitive data, the cost of encryption and decryption is reduced, thus, improving performance. Encryption of only the security-sensitive data also provides good serviceability as command and diagnostic messages are not encrypted.

Figure 5:
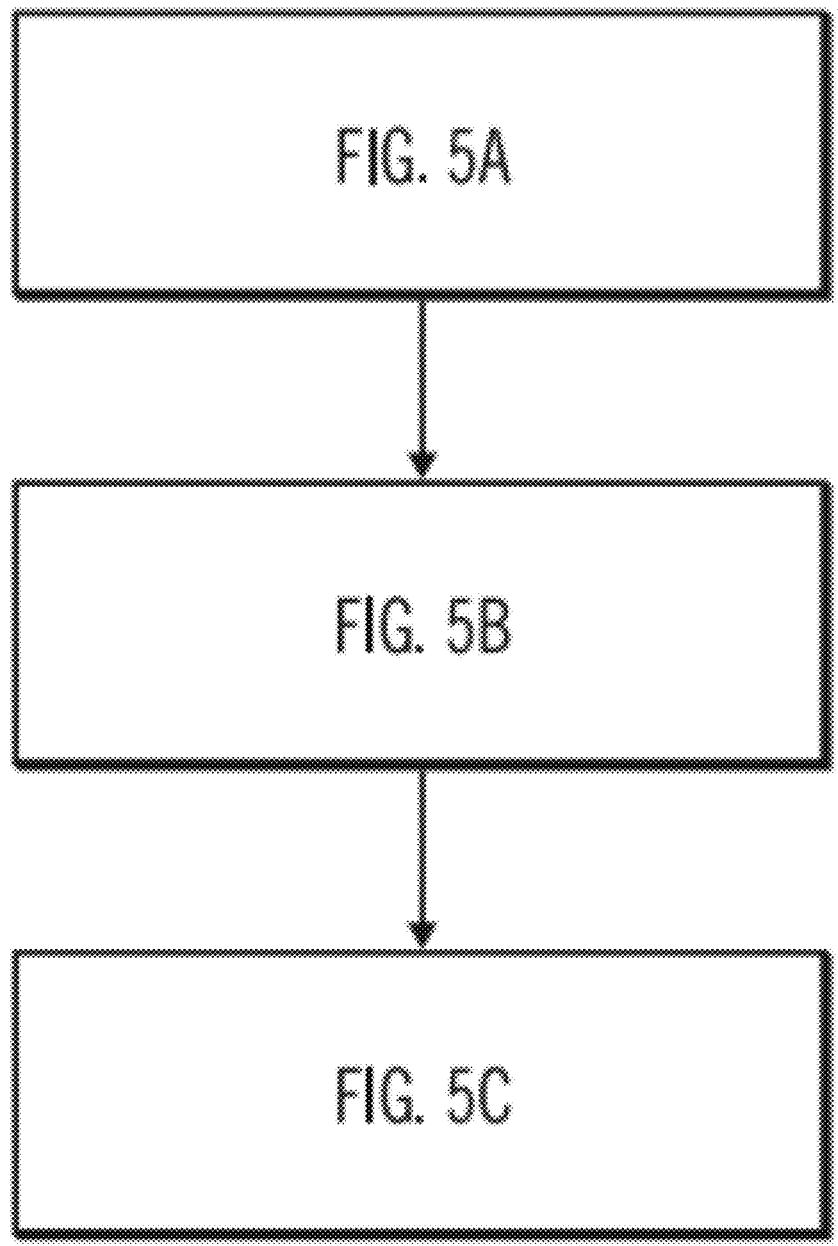
FIG. 5 illustrates logic performed by a client and server, respectively, in accordance with certain embodiments.

FIG. 5 illustrates logic performed by a client and server, respectively, in accordance with certain embodiments. FIG. 5 includes FIG. 5A, FIG. 5B, and FIG. 5C, where processing starts in FIG. 5A, continues from FIG. 5A to FIG. 5B, and continues from FIG. 5B to FIG. 5C.

Figure 5A:
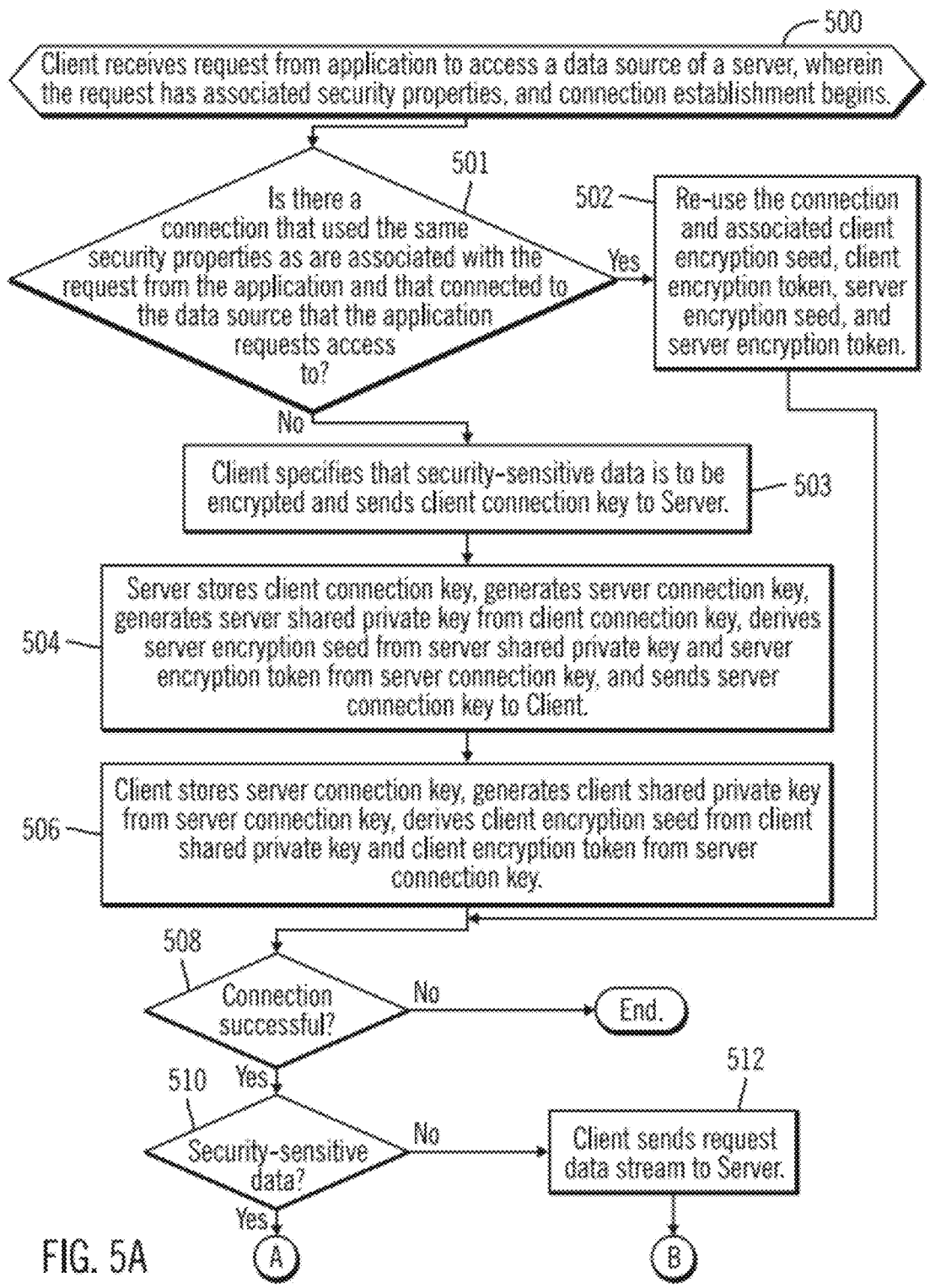

Control begins at block 500 of FIG. 5A, with the client receiving a request from an application at the client to access a data source of a server, wherein the request has associated security properties, and connection establishment begins. Connection establishment refers to creating a connection between the client and server so that data may be transmitted between them. During connection establishment, an encryption token and an encryption seed to be used for security-sensitive data encryption may be generated by the client and server.

In block 501, the client (using the shared connection system 170) determines whether there is a connection in the pool that used the same security properties as requested by the application requesting the connection to connect to a same data source (e.g., databases). If so, processing continues to block 502, otherwise, processing continues to block 503. In block 502, the client and server re-use the connection; the client re-uses the associated client encryption seed and the associated client encryption token; and the server re-uses the associated server encryption seed and the associated server encryption token. From block 502, processing continues to block 508. Thus, different applications at the client may share the same connection and the same connection keys, tokens, and seeds.

In block 503, the client specifies that security-sensitive data is to be encrypted (rather than all data) and sends a client connection key to the server. In particular, in block 504, the server stores the received client connection key, generates a server connection key, generates a server shared private key from the client connection key, derives a server encryption seed from the server shared private key and a server encryption token from the server connection key, and sends the server connection key to the client. In certain embodiments, the client and server connection keys and the client and server shared private keys are generated using a Diffie-Hellman distribution technique.

In block 506, the client stores the received server connection key, generates a client shared private key from the server connection key, and derives a client encryption seed from the client shared private key and a client encryption token from the server connection key. In block 508, the client determines whether the connection was successfully established. If so, processing continues to block 510, otherwise, processing ends.

Figure 5B:
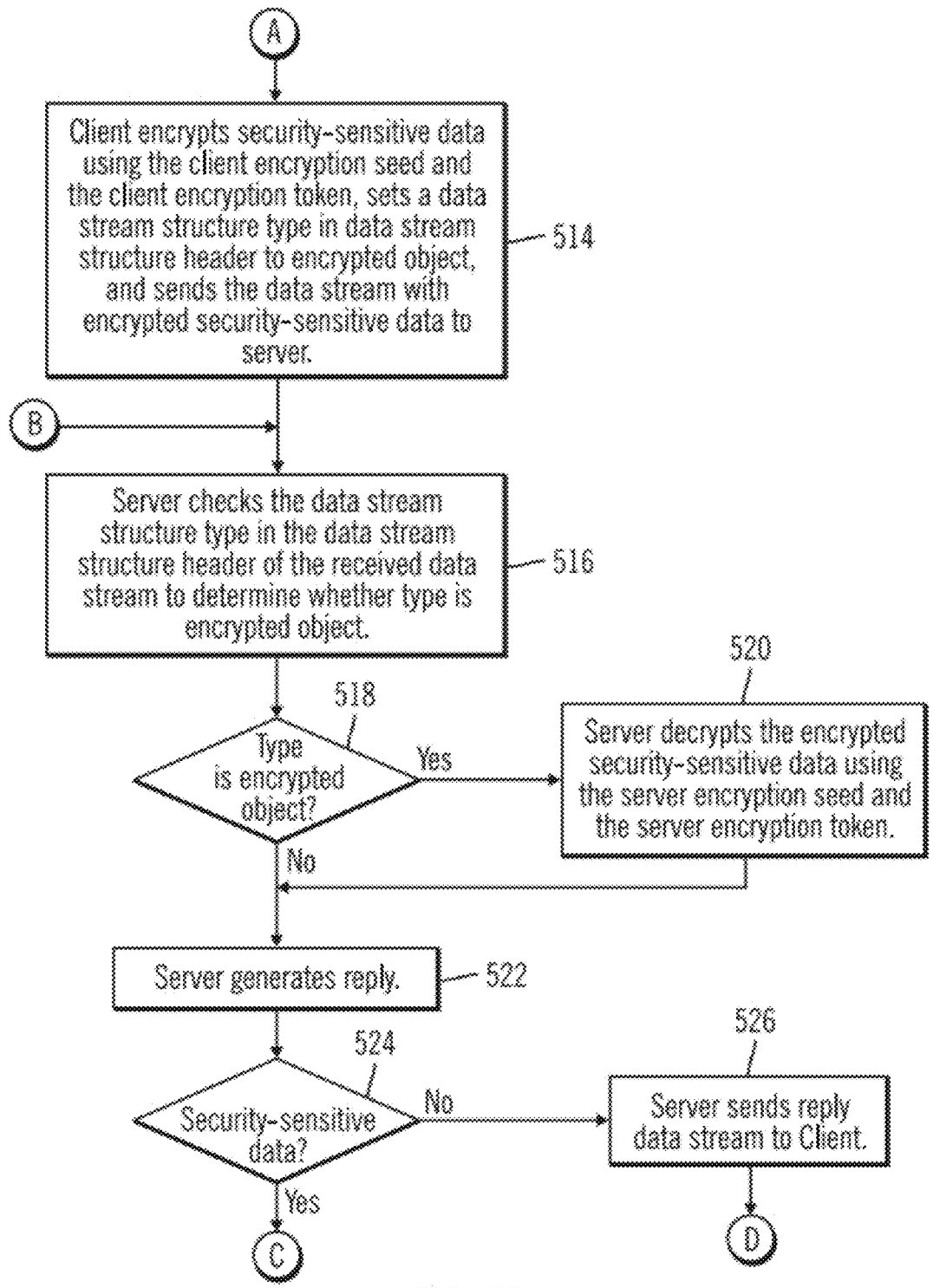
Figure 5C:
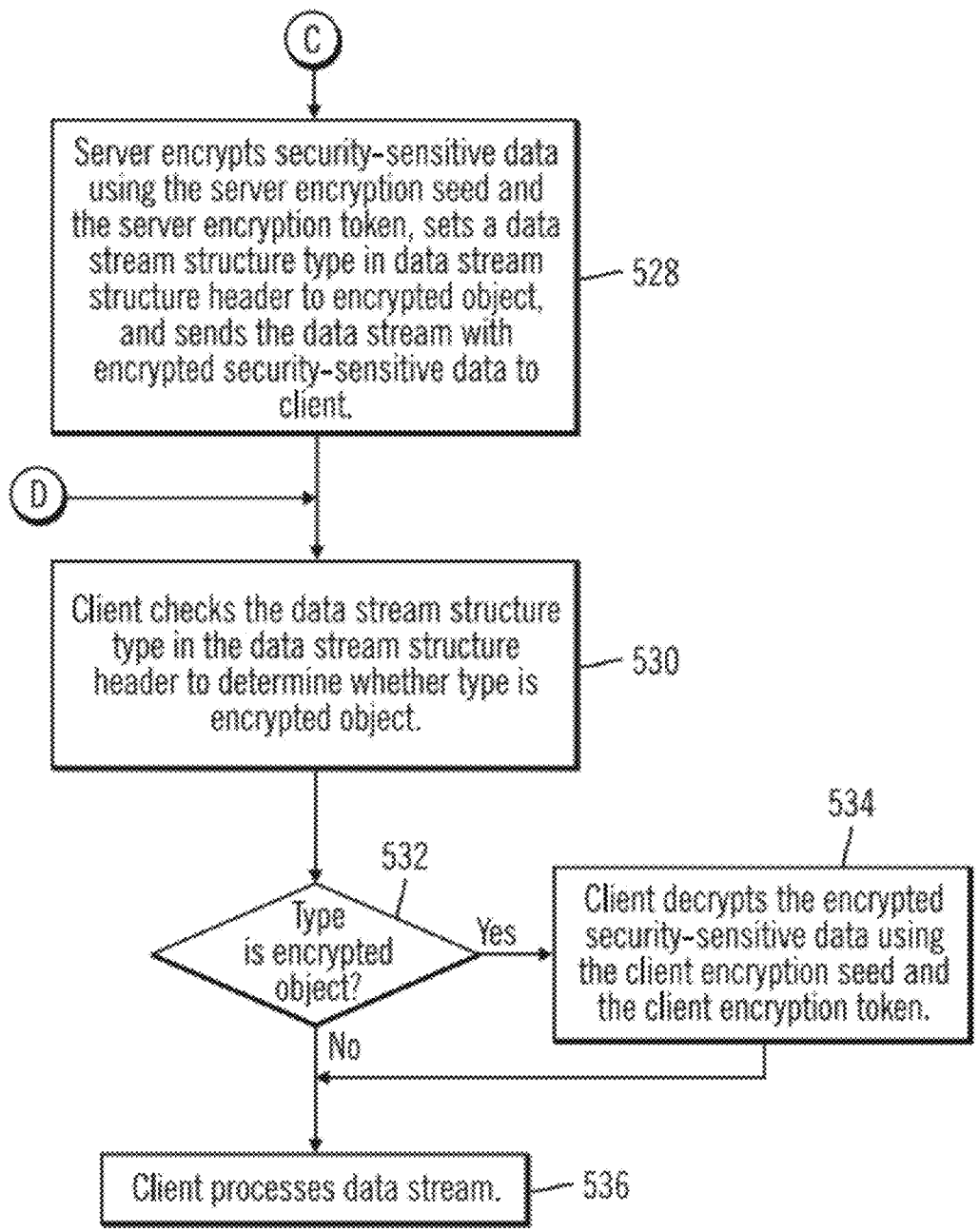

In block 510, the client determines whether security-sensitive data (e.g., object data stream structures) is present in the request data stream. If so, processing continues to block 514 (FIG. 5B), otherwise, processing continues to block 512. In block 512, the client sends the request data stream to the server, and processing continues to block 516 (FIG. 5B).

In block 514, the client encrypts the security-sensitive data using the generated client encryption seed and the client encryption token, sets a data stream structure type in a data stream structure header to encrypted object, and sends the data stream with the encrypted security-sensitive data to the server.

In block 516, the server checks the data stream structure type in the data stream structure header of the received data stream to determine whether the type is encrypted object. In block 518, if the type is encrypted object, processing continues to block 520, otherwise, processing continues to block 522. In block 520, the server decrypts the encrypted security-sensitive data using the server encryption seed and the server encryption token, and processing continues to block 522.

In block 522, the server generates a reply. In block 524, the server determines whether security-sensitive data (e.g., object data stream structures) is present in the reply data stream. If so, processing continues to block 528 (FIG. 5C), otherwise, processing continues to block 526. In block 526, the server sends the reply data stream to the client, and processing continues to block 530 (FIG. 5B).

In block 528, the server encrypts security-sensitive data using the server encryption seed and the server encryption token, sets a data stream structure type in a data stream structure header to encrypted object, and sends the data stream with the encrypted security-sensitive data to the client.

In block 530, the client checks the data stream structure type in the data stream structure header to determine whether the type is encrypted object. In block 532, if the type is encrypted object, processing continues to block 534, otherwise, processing continues to block 536. In block 534, the client decrypts the encrypted security-sensitive data using the client encryption seed and the client encryption token, and processing continues to block 536. In block 536, the client processes the data stream.

Figure 6:
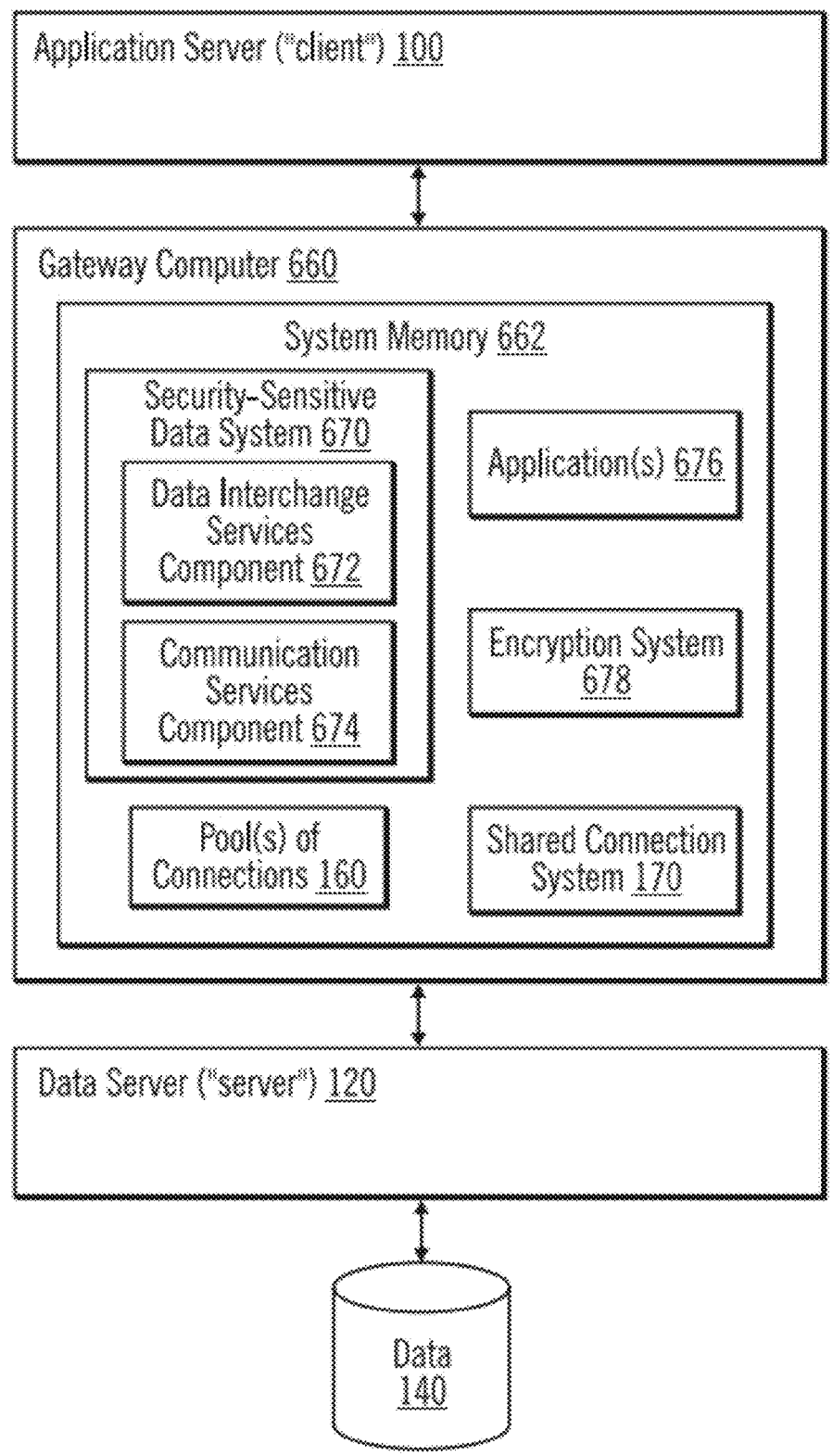
FIG. 6 illustrates, in a block diagram, a gateway computing environment in accordance with certain embodiments of the invention.

FIG. 6 illustrates, in a block diagram, a gateway computing environment in accordance with certain embodiments of the invention. In FIG. 6, a gateway computer 660 resides between application server 100 and data server 120. In particular, application server 100 is connected by a communication path to gateway computer 660, which, in turn, is connected by a communication path to data server 120. Details of the application server 100 and data server 120 are provided in FIG. 1. The gateway computer 660 includes system memory 662, which may be implemented in volatile and/or non-volatile devices. A security-sensitive data system 670, one or more applications 676, an encryption system 678, one or more pools of connections 160, and a shared connection system 170 are stored in the system memory 662 for execution on gateway computer 660. The shared connection system 170 determines that a connection in the pool qualifies for re-use if the connection has already been established to the same data source using the same security properties. Thus, the gateway computer 660 may re-use a connection, the client encryption seed, the client encryption token, the server encryption seed, and the server encryption token, and there is no client and server connection key generation. The security-sensitive data system 670 is capable of encrypting or decrypting security-sensitive data (e.g., security-sensitive user data) in a data stream. The security-sensitive data system 670 includes a data interchange services component 672 and a communication services component 674. The data interchange services component 672 identifies a security-sensitive portion of data. The communication services component 674 determines that a portion is identified as security-sensitive and calls the encryption system 678 to encrypt or decrypt the portion of security-sensitive data. When encryption is performed, the communication services component 674 marks the portion as being security sensitive (e.g., by setting an object data stream structure type as "encrypted object") and transmits the data stream. The marking enables the receiver of the data stream to identify the portion that has been encrypted.

Although one gateway computer 660 is illustrated for simplicity and ease of understanding, any number of gateway computers may reside between the application server 100 and data server 120.

The application server 100, data server 120, and gateway computer 660 may comprise any computing device known in the art, such as a server, mainframe, workstatation, personal computer, hand held computer, laptop telephony device, network appliance, etc. Each computer system 100, 120, 660 may take on the role of "client", "server", or "gateway computer".

Embodiments provide a gateway solution to avoid decrypting and re-encrypting the encrypted security-sensitive data stream. In the gateway solution, when the gateway computer 660 receives a data stream, the gateway acts as a "client", and, when the gateway transmits a data stream, the gateway acts as a "server".

Figure 7:
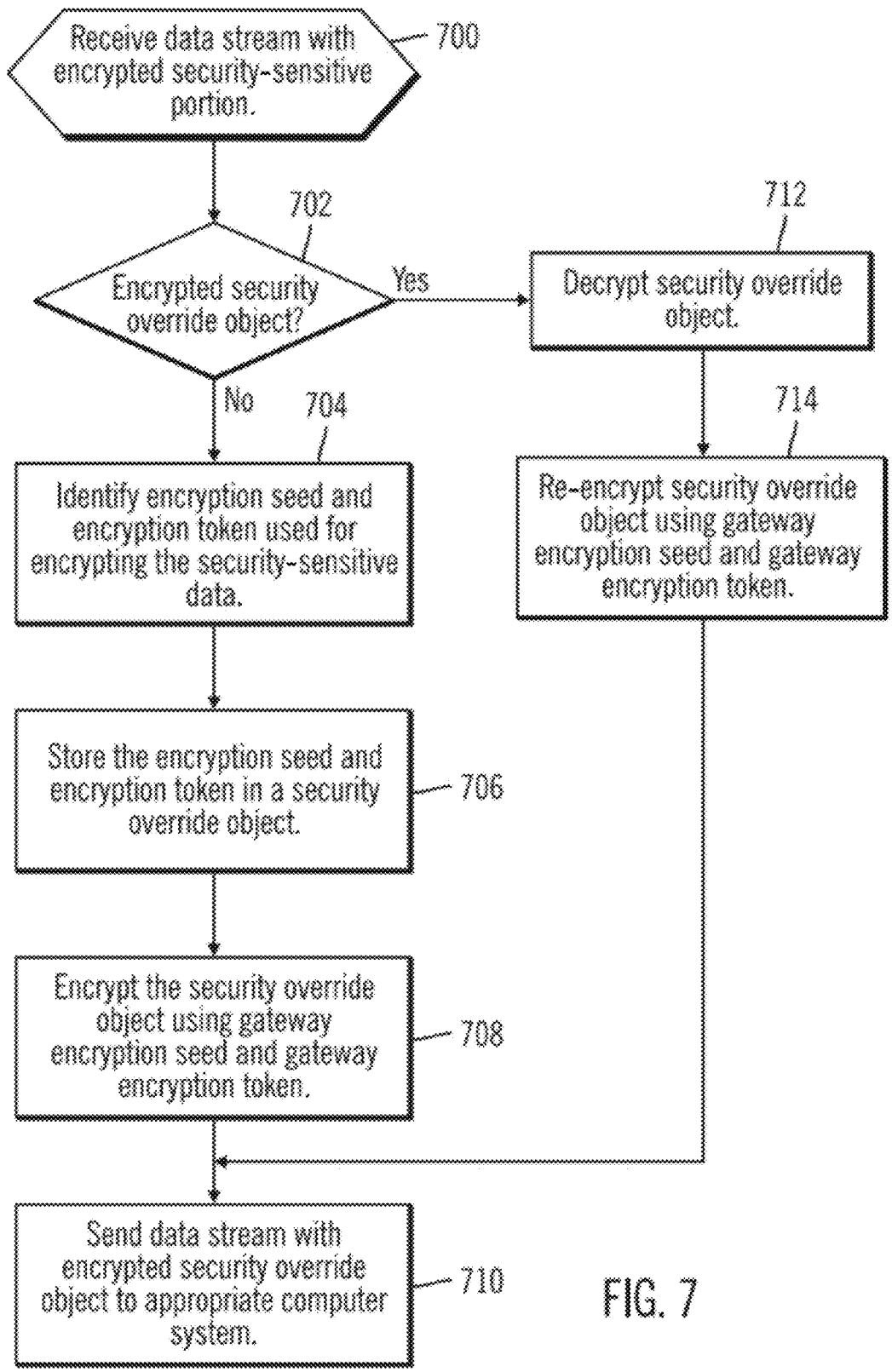
FIG. 7 illustrates logic performed by the security-sensitive data system when a data stream is received at a gateway computer in accordance with certain embodiments.

FIG. 7 illustrates logic performed by the security-sensitive data system 670 when a data stream is received at a gateway computer 660 in accordance with certain embodiments. Initially, connections are established between each pair of computer systems (e.g., a gateway computer and the application server 100, the same or another gateway computer 660 and the data server 120, any pair of gateway computers in the communication path between the application server 100 and the data server 120, etc.). During connection establishment, shared private keys, encryption tokens, and encryption seeds are generated at each computer system involved in the connection establishment.

Control begins at block 700 with the gateway computer 660 receiving a data stream with an encrypted security-sensitive portion. In block 702, the security-sensitive data system 670 determines whether the data stream includes an encrypted security override object. If so, processing continues to block 712, otherwise, processing continues to block 704.

In block 704, the security-sensitive data system 670 identifies the encryption seed and encryption token used for encrypting the security-sensitive data (i.e., the encryption seed and encryption token used by the sender of the data stream). In block 706, the security-sensitive data system 670 stores the encryption seed and encryption token in a security override object. In block 708, the security-sensitive data system 670 encrypts the security override object using a gateway encryption seed and a gateway encryption token. In block 710, the security-sensitive data system 670 transmits the data stream with the encrypted security override object to the appropriate computer system (e.g., application server 100, another gateway computer, or data server 120).

If the data stream includes an encrypted security override object, then the data stream is from another gateway computer. In block 712, the security-sensitive data system 670 decrypts the security override object. In block 714, the security-sensitive data system 670 re-encrypts the security override object using the gateway encryption seed and gateway encryption token, and processing continues to block 710.

Thus, if a gateway computer receives encrypted security-sensitive data (e.g., object data stream structures), then, instead of decrypting and re-encrypting the encrypted security-sensitive data, the gateway computer sends the encryption seed and the encryption token used for encrypting the security-sensitive data in a security override object and encrypts the security override object.

Also, if a gateway computer receives an encrypted security override object along with the encrypted security-sensitive data, then the gateway computer decrypts and re-encrypts the encrypted security override object, without having to decrypt and re-encrypt the security-sensitive data.

Figure 8:
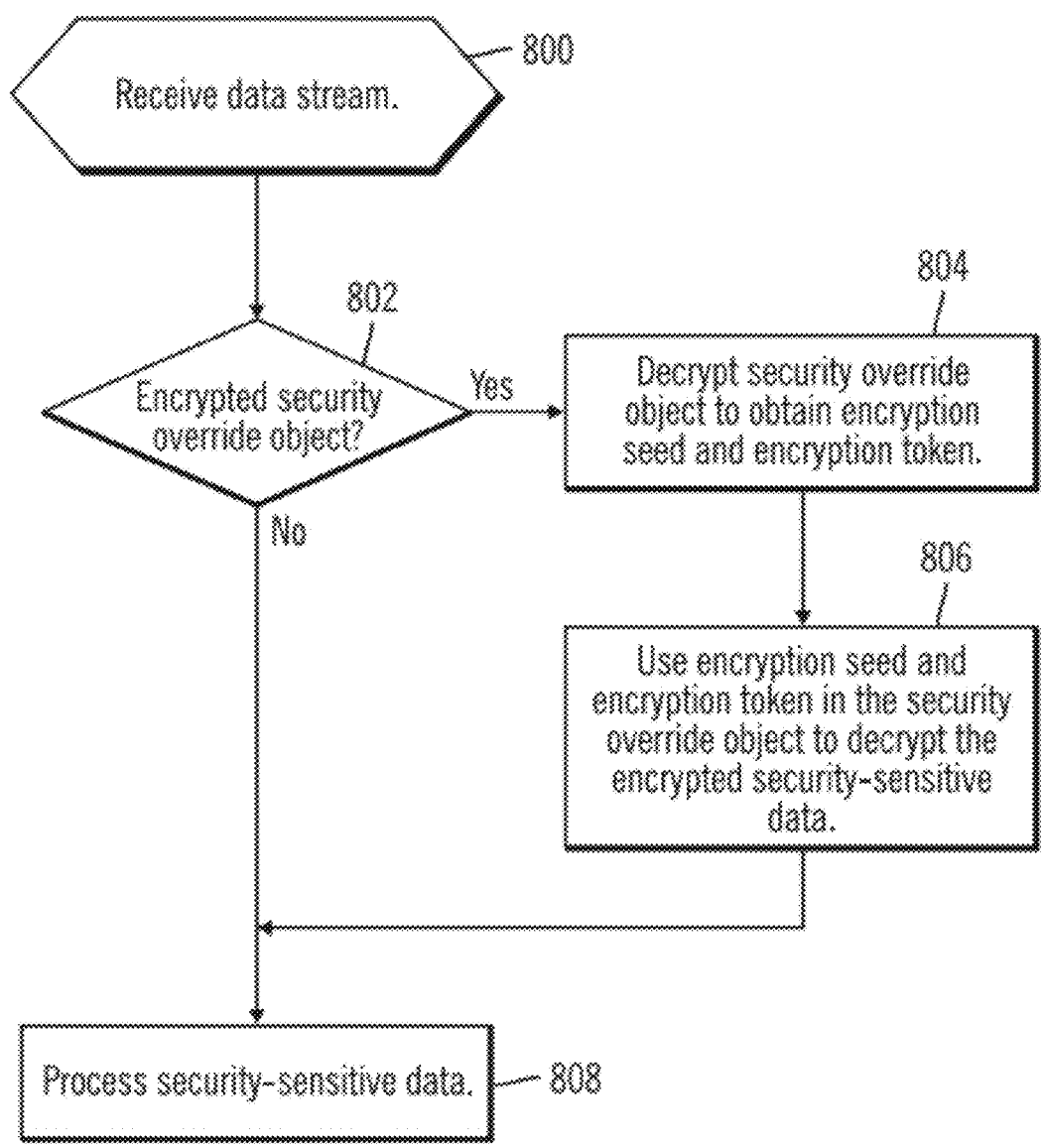
FIG. 8 illustrates logic performed by the security-sensitive data system when a data stream is received from a gateway computer at a destination computer in accordance with certain embodiments.

FIG. 8 illustrates logic performed by the security-sensitive data system 110, 130 when a data stream is received from a gateway computer 660 at a destination computer in accordance with certain embodiments. The term "destination" computer is used to refer to the computer system for which the data stream is destined (e.g., the application server 100 or the data server 120), rather than a gateway computer. Control begins at block 800, with the security-sensitive data system 110, 130 receiving a data stream. In block 802, the security-sensitive data system 110, 130 determines whether the data stream includes an encrypted security override object. If so, processing continues to block 804, otherwise, processing continues to block 808.

In block 804, the security-sensitive data system 110, 130 decrypts the security override object to obtain an encryption seed and an encryption token. In block 806, the security-sensitive data system 110, 130 uses the encryption seed and the encryption token in the security override object to decrypt the encrypted security-sensitive data, and processing continues to block 808. In block 808, the security-sensitive data system 110, 130 processes the security-sensitive data.

Thus, embodiments use a shared private key for encryption to secure security-sensitive data during transmission between computing systems by encrypting security-sensitive data in a data stream, rather than the entire data stream. Security-sensitive data stream encryption improves performance when processing online database transactions in client-server communications. For example, by identifying security-sensitive data and encrypting only the security-sensitive data in the data stream, performance is improved. Moreover, since error messages are not encrypted, it is easier to debug data stream problems, and, thus, encryption of security-sensitive data provides good serviceability.

Therefore, embodiments provide a fast and efficient technique to encrypt security-sensitive data in a distributed database transaction environment, such as a client server environment, using a shared private key.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic or circuitry may be coupled to a processor to perform operations.

Figure 9:
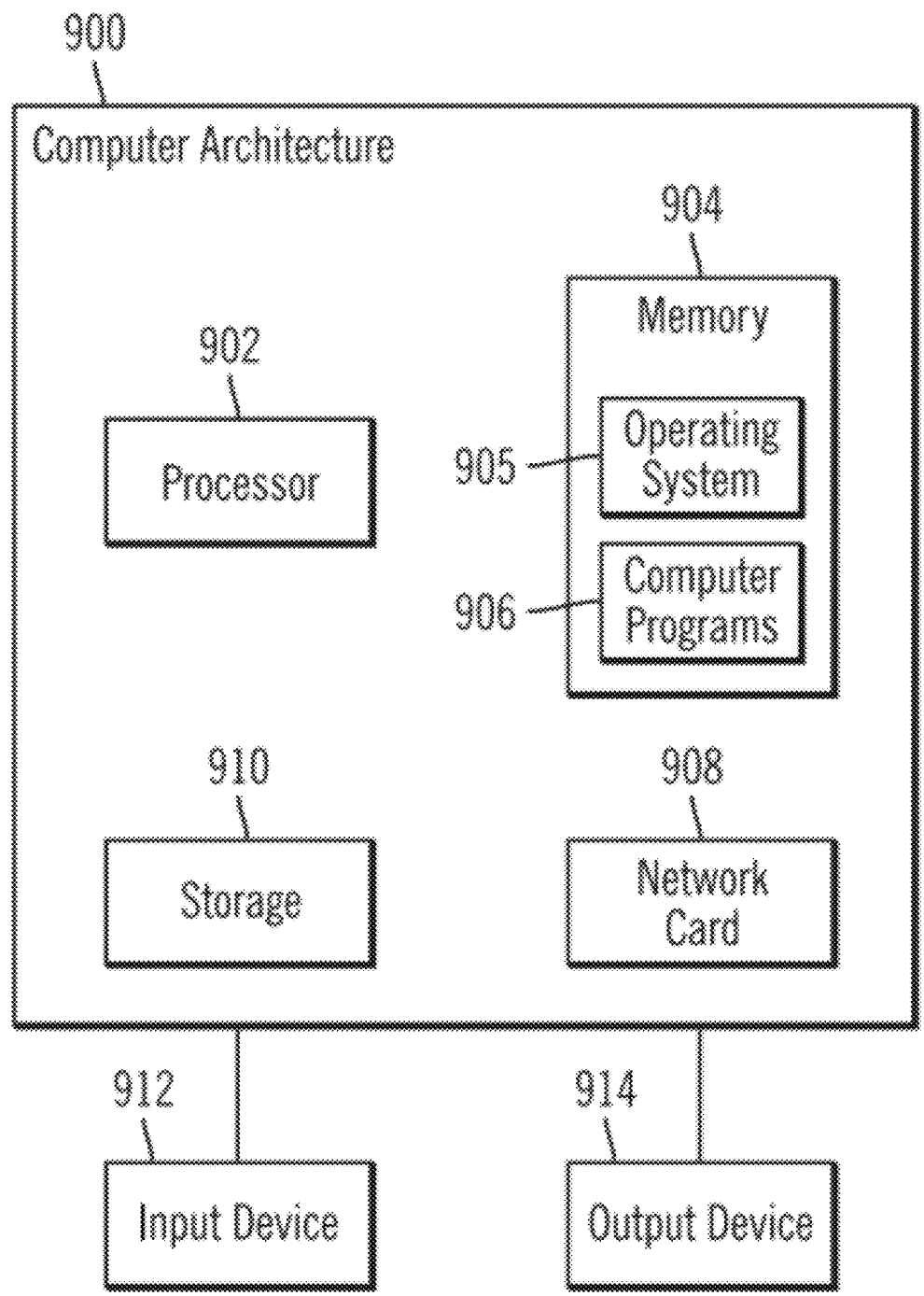
FIG. 9 illustrates an architecture of a computer system that may be used in accordance with certain embodiments.

FIG. 9 illustrates an architecture 900 of a computer system that may be used in accordance with certain embodiments. Servers 100 and 120 and gateway computer 660 may implement architecture 900. The computer architecture 900 may implement a processor 902 (e.g., a microprocessor), a memory 904 (e.g., a volatile memory device), and storage 910 (e.g., a non-volatile storage area, such as magnetic disk drives, optical disk drives, a tape drive, etc.). An operating system 905 may execute in memory 904. The storage 910 may comprise an internal storage device or an attached or network accessible storage. Computer programs 906 in storage 910 may be loaded into the memory 904 and executed by the processor 902 in a manner known in the art. The architecture further includes a network card 908 to enable communication with a network. An input device 912 is used to provide user input to the processor 902, and may include a keyboard, mouse, pen-stylus, microphone, touch sensitive display screen, or any other activation or input mechanism known in the art. An output device 914 is capable of rendering information from the processor 902, or other component, such as a display monitor, printer, storage, etc. The computer architecture 900 of the computer systems may include fewer components than illustrated, additional components not illustrated herein, or some combination of the components illustrated and additional components.

The computer architecture 900 may comprise any computing device known in the art, such as a mainframe, server, personal computer, workstation, laptop, handheld computer, telephony device, network appliance, virtualization device, storage controller, etc. Any processor 902 and operating system 905 known in the art may be used.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for processing data, comprising:
at a client computer including a processor,
storing connections having different security properties that identify different security-sensitive portions of data to be encrypted, wherein each of the connections allows applications at the client computer to access data sources at a server computer, and wherein each of the connections has an associated client encryption seed, client encryption token, server encryption seed, and server encryption token;
receiving a request from an application to access a data source, wherein the request has associated security properties that identify security-sensitive portions of data to be encrypted;
in response to the client computer requesting establishment of a connection on behalf of the application, determining, at the client computer, whether there is a stored connection that used a same set of security properties as are associated with the request from the application and that connected to the data source that the application requests access to based on the security-sensitive portions of data to be encrypted associated with the request and the security-sensitive portions of data to be encrypted associated with each stored connection;
in response to determining that there is a stored connection that used the same set of security properties and that connected to the data source, re-using the client encryption seed, the client encryption token, the server encryption seed, and the server encryption token associated with the connection; and
in response to determining that there is not a connection that used the same set of security properties and that connected to the data source, generating a new client connection key, a new client encryption seed, a new client encryption token, a new sever connection key, a new server encryption seed, and a new server encryption token.

2. The method of claim 1, wherein the security properties specify an encryption technique.

3. The method of claim 1, further comprising:
terminating a connection.

4. The method of claim 1, further comprising:
determining that a portion of a data stream to be transmitted includes a security-sensitive portion;
encrypting the security-sensitive portion of the data stream;
marking the encrypted security-sensitive portion as encrypted; and
transmitting the data stream with the encrypted security-sensitive portion.

5. The method of claim 1, further comprising:
establishing the connection with an indication that a security-sensitive portion of each data stream is to be encrypted without encrypting the entire data stream.

6. A computer program product comprising a storage device storing a computer readable program, wherein the computer readable program when executed by a processor on a client computer causes the client computer to perform:
storing connections having different security properties that identify different security-sensitive portions of data to be encrypted, wherein each of the connections allows applications at the client computer to access data sources at a server computer, and wherein each of the connections has an associated client encryption seed, client encryption token, server encryption seed, and server encryption token;

receiving a request from an application to access a data source, wherein the request has associated security properties that identify security-sensitive portions of data to be encrypted;

in response to the client computer requesting establishment of a connection on behalf of the application, determining whether there is a stored connection that used a same set of security properties as are associated with the request from the application and that connected to the data source that the application requests access to based on the security-sensitive portions of data to be encrypted associated with the request and the security-sensitive portions of data to be encrypted associated with each stored connection;

in response to determining that there is a stored connection that used the same set of security properties and that connected to the data source, re-using the client encryption seed, the client encryption token, the server encryption seed, and the server encryption token associated with the connection; and in response to determining that there is not a connection that used the same set of security properties and that connected to the data source, generating a new client connection key, a new client encryption seed, a new client encryption token, a new sever connection key, a new server encryption seed, and a new server encryption token.

7. The computer program product of claim 6, wherein the security properties specify an encryption technique.

8. The computer program product of claim 6, wherein the computer readable program when executed by the processor on the client computer causes the client computer to perform:
terminating a connection.

9. The computer program product of claim 6, wherein the computer readable program when executed by the processor on the client computer causes the client computer to perform:
determining that a portion of a data stream to be transmitted includes a security-sensitive portion;
encrypting the security-sensitive portion of the data stream;
marking the encrypted security-sensitive portion as encrypted; and
transmitting the data stream with the encrypted security-sensitive portion.

10. The computer program product of claim 6, wherein the computer readable program when executed by the processor on the client computer causes the client computer to perform:
establishing the connection with an indication that a security-sensitive portion of each data stream is to be encrypted without encrypting the entire data stream.

11. A system for processing data, comprising:
a processor at a client computer; and
a storage device coupled to the processor, wherein the storage device stores a computer program, wherein the processor executes the computer program to perform operations, and wherein the operations comprise:

storing connections having different security properties that identify different security-sensitive portions of data to be encrypted, wherein each of the connections allows applications at the client computer to access data sources at a server computer, and wherein each of the connections has an associated client encryption seed, client encryption token, server encryption seed, and server encryption token;

receiving a request from an application to access a data source, wherein the request has associated security properties that identify security-sensitive portions of data to be encrypted;

in response to the client computer requesting establishment of a connection on behalf of the application, determining whether there is a stored connection that used a same set of security properties as are associated with the request from the application and that connected to the data source that the application requests access to based on the security-sensitive portions of data to be encrypted associated with the request and the security-sensitive portions of data to be encrypted associated with each stored connection;

in response to determining that there is a stored connection that used the same set of security properties and that connected to the data source, re-using the client encryption seed, the client encryption token, the server encryption seed, and the server encryption token associated with the connection; and in response to determining that there is not a connection that used the same set of security properties and that connected to the data source, generating a new client connection key, a new client encryption seed, a new client encryption token, a new sever connection key, a new server encryption seed, and a new server encryption token.

12. The system of claim 11, wherein the security properties specify an encryption technique.

13. The system of claim 11, wherein the operations further comprise:
terminating a connection.

14. The system of claim 11, wherein the operations further comprise:
determining that a portion of a data stream to be transmitted includes a security-sensitive portion;
encrypting the security-sensitive portion of the data stream;
marking the encrypted security-sensitive portion as encrypted; and
transmitting the data stream with the encrypted security-sensitive portion.

15. The system of claim 11, wherein the operations further comprise:
establishing the connection with an indication that a security-sensitive portion of each data stream is to be encrypted without encrypting the entire data stream.

* * * * *